United States Patent [19]

Bennett et al.

[11] 3,960,811

[45] June 1, 1976

[54] PROCESS FOR THE PREPARATION OF AN AMORPHOUS POLYPHENYLENE OXIDE

[75] Inventors: James G. Bennett, Menands; Glenn D. Cooper, Delmar, both of N.Y.

[73] Assignee: General Electric Company, Pittsfield, Mass.

[22] Filed: Aug. 19, 1970

[21] Appl. No.: 65,286

[52] U.S. Cl. .................. 260/47 ET; 260/33.6 R; 260/33.8 R; 260/884; 260/886
[51] Int. Cl.$^2$ ................ C08G 65/44; C08G 65/46; C08G 65/48
[58] Field of Search ...................... 260/47 ET

[56] References Cited
UNITED STATES PATENTS

| | | | |
|---|---|---|---|
| 3,219,626 | 11/1965 | Blanchard et al. | 260/47 |
| 3,306,875 | 2/1967 | Hay | 260/47 |
| 3,337,499 | 8/1967 | Bussink et al. | 260/47 |
| 3,342,892 | 9/1967 | Laakso et al. | 260/823 |
| 3,344,116 | 9/1967 | Borman | 260/47 |
| 3,382,212 | 5/1968 | Price et al. | 260/47 |
| 3,384,619 | 5/1968 | Hori et al. | 260/47 |
| 3,440,217 | 4/1969 | Faurote et al. | 260/47 |
| 3,442,885 | 5/1969 | Wieden et al. | 260/47 |
| 3,455,880 | 7/1969 | Kobayashi et al. | 260/47 |
| 3,573,257 | 3/1971 | Nakashio et al. | 260/47 |

OTHER PUBLICATIONS

Frith et al., "Linear polymers," Longmans, Green & Co., New York 1951, p. 158.

*Primary Examiner*—Lester L. Lee
*Attorney, Agent, or Firm*—William F. Mufatti; Edward A. Hedman; James V. Costigan

[57] ABSTRACT

Amorphous polyphenylene oxide resins and polyphenylene oxide resins with lower degrees of crystallinity are prepared by adding a solution thereof to an antisolvent. The resins have from about 0 to 75 percent of the crystallinity of conventional polyphenylene oxide resins and provide compositions, e.g., with styrene resins, having maximum physical properties after a single extrusion.

5 Claims, No Drawings

PROCESS FOR THE PREPARATION OF AN AMORPHOUS POLYPHENYLENE OXIDE

This invention relates to amorphous polyphenylene oxide resins and those of reduced crystallinity and processes to prepare the same.

BACKGROUND OF THE INVENTION

The polyphenylene oxide resins are known and described, for example, in A. S. Hay, U.S. Pat. No. 3,306,874 and U.S. Pat. No. 3,306,875. They are high molecular weight thermoplastic polymers useful for many commercial applications. For many uses, however, the relatively high melt viscosities and softening points of the unmodified resins are disadvantageous.

The Hay patents disclose the preparation of polyphenylene oxide resins by a general procedure comprising passing oxygen gas into a solution containing a 2,6-disubstituted phenol and a copper-amine complex until formation of the product is substantially complete.

Both Hay patents disclose that the polyphenylene oxide resins are conveniently recovered by precipitation from solution with an antisolvent, i.e., a non-solvent for the resin which is miscible with the solvent containing the resin.

Hay, U.S. Pat. No. 3,306,875, Example 4 discloses the precipitation of polyphenylene oxide from pyridine solution with dilute aqueous hydrochloric acid, methanol, ethanol, isopropanol or acetone. After examining the products, it was concluded that the particular antisolvent had no noticeable effect on the physical or chemical properties of the high softening, high melt viscosity product.

It has now been found that by varying the precipitation conditions, i.e., solvent/antisolvent and method of adding, polyphenylene oxide resins can be obtained in either partially crystalline or completely amorphous forms. Such resins have substantial and unexpected advantages in comparison with those prepared by the prior art techniques, especially when used as components in thermoplastic molding compositions.

Polyphenylene oxide resins of conventional crystallinity modified with styrene resins are described in E. P. Cizek, U.S. 3,383,435. These compositions include melt blended products as well as compositions with styrene grafted with other materials, e.g., rubber; and copolymers and interpolymers thereof with styrene and other monomer constituents and those where part of if not all of the styrene is grafted onto the polyphenylene oxide. The polyphenylene oxide component in such compositions upgrades many properties of polystyrene and the polystyrene component improves the moldability of polyphenylene ethers. Most unexpectedly, however, such compositions have many properties, e.g., flexural strength, impact strength, melt stability and solvent resistance, improved over those of either the polyphenylene oxide or the styrene resin alone. However, the compositions of the Cizek patent provide molded articles of only moderate impact strengths as measured by the notched Izod test, and somewhat less elongation than expected. Furthermore, maximum properties in compositions prepared according to the Cizek teachings — and employing the polyphenylene oxides based on the Hay disclosures — are only attained after double-extrusion at relatively high temperatures.

In the Cizek patent it is disclosed that, although the method of combining the polyphenylene oxide resin with the styrene resin was not critical, the preferred method (and that used to prepare the samples on which the physical properties were measured) constituted blending the two polymers in powder or granular form, extruding the blend, chopping into pellets and re-extruding.

In the copending application of Gim F. Lee, Jr., entitled "Composition of Polyphenylene Oxide and a Styrene Resin", filed on the same day as the present application, and assigned to the same assignee, Ser. No. 65,294, it is disclosed that the physical properties, especially the impact strengths and elongations, of thermoplastic compositions of polyphenylene oxide with styrene resins can be substantially improved by reducing or eliminating the crystallinity of conventional polyphenylene oxide.

Furthermore, the said copending application discloses that amorphous polyphenylene oxide or that containing only a percentage of the crystallinity of conventionally crystalline polyphenylene oxide is fully compatible in all proportions with styrene resins and is capable of forming a single phase alloy therewith in only one pass through an extruder.

The present application discloses a process to provide such amorphous polyphenylene oxides and polyphenylene oxides of reduced crystallinity.

It is, therefore, a primary object of this invention to provide polyphenylene oxide resins of modified crystallinity.

Another object of this invention is to provide polyphenylene oxide resins with from 0 to 75 percent of the crystallinity of conventionally produced resins.

Still another object of this invention is to provide improved polyphenylene oxide resins for extrusion with styrene resins to yield thermoplastic molding compositions more efficiently and economically and with improved physical properties.

DESCRIPTION OF THE INVENTION

The above-mentioned advantages and objects and others which will be readily apparent to those skilled in the art are provided with the process of this invention which affords amorphous polyphenylene oxide, or polyphenylene oxide with lower than conventional amounts of crystallinity.

According to this invention there is provided a process for the preparation of an amorphous or partially crystalline polyphenylene oxide having a degree of polymerization of at least 100 which comprises adding a solution thereof to an antisolvent whereby there is obtained a product with from about 0 to about 75 percent of the crystallinity of a control sample of said polyphenylene oxide which has been precipitated by adding an antisolvent to a solution of said control sample.

The polyphenylene oxides with which the process of this invention is primarily concerned are those having the repeating structural unit of the formula

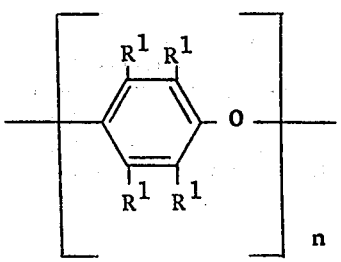

wherein the oxygen ether atom of one unit is connected to the benzene nucleus of the next repeating unit, n is a positive integer and is at least 100 and each $R^1$ is a monovalent substituent selected from hydrogen, halogen, hydrocarbon radicals free of a tertiary alpha-carbon atom, halohydrocarbon radicals having at least two carbon atoms between the halogen atom and phenyl nucleus and being free of a teriary alpha-carbon atom, hydrocarbonoxy radicals being free of a tertiary alpha-carbon atom, and halohydrocarboxy radicals having at least two carbon atoms between the halogen atom and the phenyl nucleus and being free of a tertiary alpha-carbon atom. Solutions of these can be obtained by following the disclosure in the above-mentioned Hay patents.

A preferred family of polyphenylene oxides for the process of this invention are those having the repeating structural unit of the formula:

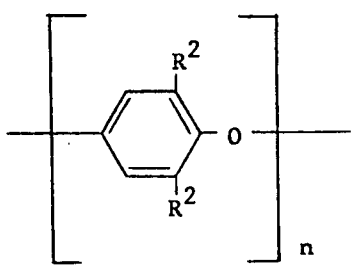

wherein each $R^2$ is alkyl of from about 1 to about 4 carbon atoms, and n is a whole integer of at least 100. Thus the preferred polyphenylene ethers are those having alkyl substitution orthoto the oxygen ether atom and most preferably, ortho-methyl substitution. These polymers, particularly poly(2,6-dimethyl-1,4-phenylene)oxide, are preferred because they combine with styrene polymers to form compositions with the most advantageous properties.

The polyphenylene oxide resins prepared by the process of this invention are amorphous or of reduced crystallinity as compared to conventional polyphenylene oxide resins. In particular, the polyphenylene oxide resins used in this invention will have a degree of polymerization of at least 100, i.e., there will be at least 100 repeating units in the average polymer chain. Furthermore, the polyphenylene oxide resins used in the present composition will have from about 0 to about 75 percent of the crystallinity of a control sample of the same polyphenylene oxide which has been precipitated by adding an antisolvent to a solution of said control sample.

This terminology is used in an art-recognized sense to define a family of polymers with a particular morphology or state of order/disorder. It is used also because the so-called conventional polyphenylene oxides, prepared following the teachings of the Hay patents, for example, are not completely crystalline, but rather only about 30–40 percent crystalline.

The evidence for this resides in data from differential scanning calorimetry (DSC) which show a heat of fusion, $\Delta Q$, for conventional resins of from about 3.3 to about 3.7 calories/gram. Since the theoretical heat of fusion for 100% crystalline polyphenylene oxide is about 10 cal./g., from these data the crystallinity of the conventional material is estimated to be, approximately, from 30 to 40 percent.

As contemplated herein and in the appended claims, a "control sample" will comprise a polyphenylene oxide with a degree of polymerization of at least 100 which has been precipitated by adding an antisolvent to a solution of said control sample. In every case, with no known exceptions, this will provide a polyphenylene oxide with a maximum practically attainable degree of order in the polymer chain, i.e., the highest percentage crystallinity obtainable under the circumstances. The nature of the solvent to be used for the preparation of the control sample is not particularly critical, so long as it is a good solvent for the polymer and completely miscible with the antisolvent, i.e., precipitant. Illustrative solvents are chloroform, toluene, pyridine, benzene, and the like. The antisolvent will cause precipitation of the control sample of polymer when it is mixed with the polymer solution. Illustrative antisolvents are methanol, ethanol, acetone and hexane.

To prepare the control sample it is convenient and preferred to provide a solution of polyphenylene oxide in toluene, benzene or chloroform and to add methanol thereto until the polymer has been precipitated.

To prepare the amorphous or reduced crystallinity forms of polyphenylene oxide resin according to the present invention a solution of the resin is added to an antisolvent.

The determination of whether the polymer is amorphous, and if partially crystalline, the percentage of crystallinity with reference to the control sample, can be made by techniques known to those skilled in the art. One useful procedure is to employ differential scanning calorimetry. Amorphous polymers will not show a crystal melting point. Partially crystalline polymers will provide data to determine $\Delta Q$, the heat of fusion. As has been mentioned above, this is directly related to the percentage of crystallinity. The lower the heat of fusion — the lower the percent crystallinity. In the products of the presently claimed process, therefore, $\Delta Q$ will vary from 0 to 0.75 times the $\Delta Q$ value for the control sample.

To prepare the amorphous or partially crystalline products, it appears that a much more limited number of solvents can be used in the process of this invention and that there is also a rather narrow group of suitable antisolvents. The solvents can comprise, in general, only aromatic hydrocarbons, e.g., benzene and toluene; and chlorinated hydrocarbons, e.g., chloroform and methylene chloride, and the like. It is preferred to use benzene, toluene and chloroform, and toluene is especially preferred.

The most useful antisolvents appear to be alcohols, especially lower aliphatic alcohols of up to about six carbon atoms, such as methanol, ethanol, isopropanol, pentanol and hexanol. Methanol is preferred.

The especially preferred way to obtain the polyphenylene oxide resins according to the present invention is to precipitate them by adding a toluene solution thereof to methanol.

The nature of the precipitate obtained by adding the polymer solution to methanol varies from stringy, fluffy material to fine powder, depending on the conditions used. Some of the controlling parameters are the polymer solution concentration, the rate of addition to antisolvent, the amount of agitation and the final antisolvent/solvent ratio (designated the S ratio). The most important parameter appears to be the final S ratio. The lower the S ratio, the more powderlike the precipitate becomes.

In general, at S ratios above about 2, e.g., from 3 to 10, the tendency to form completely amorphous polyphenylene oxide resins will be enhanced. At ratios of about 1 to about 2, the degree of crystallinity with respect to a control sample will still be low enough to be less than 75 percent of the control crystallinity. The preferred S ratios for the methanol/toluene system will generally fall between 1.5:1 and 3:1.

The polyphenylene oxide resins prepared according to the present invention are freed from all volatile solvents and the like before blending with the styrene resin. One suitable means consists of drying the resin in a vacuum oven until a constant weight is obtained.

The styrene resins with which the polyphenylene oxides of this invention are most advantageously combined are those having at least 25% polymer units derived from a compound of the formula

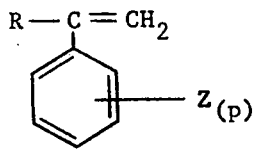

wherein
R is hydrogen, (lower)alkyl or halogen,
Z is hydrogen, (lower)alkyl, chlorine or vinyl, and
$p$ is a whole integer equal from 1 to 5.
These are illustrated by way of example in the aforesaid Cizek patent, incorporated herein by reference, and in the copending Lee application, above-mentioned. The term "styrene resin" as used herein includes, by way of illustration, homopolymers such as polystyrene and polychlorostyrene, the modified polystyrenes such as rubber modified polystyrenes, and the styrene containing copolymers such as the styrene-acrylonitrile copolymers (SAN), styrene-alpha-alkylstyrene copolymers, styrene-acrylonitrile-butadiene copolymers (ABS), poly-alpha-methylstyrene, copolymers of ethylvinylbenzene and divinylbenzene, and the like. The preferred styrenes are homopolystyrene and high impact rubber modified polystyrenes, as well as the ABS copolymers and the SAN copolymers.

The method of blending the polyphenylene oxide with the styrene resin does not constitute a part of this invention. The only requirement is that the polyphenylene oxide be homogeneously dispersed throughout the styrene resin, prior to melt blending. It is believed that with incomplete or nonhomogeneous dispersions, aggregates tend to form and impair the physical properties of the composition.

The melt blending operation may be carried out by any means known to those skilled in the art. For example, the dispersing operation may be carried out by mixing the two polymers in granular or powdered form in a Banbury mixer and/or roll mills or mixing may be carried out continuously by means of extrusion of a mixture of polymers. Another convenient method for forming such a composition consists of dissolving the two polymers in a solvent in which they are mutually soluble and co-precipitating the polymers, by pouring the solution into an antisolvent, and co-precipitating the polymers as a homogeneous mixture.

Extrusion has been found to be the preferred manner of blending the components according to this invention as this method was found to give the greatest degree of homogeniety.

In general, when forming the mixture by extrusion, the two resins, in granular or powder form, are mixed by tumbling. The finer the powder the greater the degree of homogeniety. The mixture is then fed to the hopper of an extrusion press and extruded at a temperature within the range of from about 450°F. to about 650°F. The extruded strand can be pelletized. With the present composition, there is no need to re-extrude, a practice found to be essential with conventional, crystalline polyphenylene oxide, e.g., that used in the products of Cizek, U.S. Pat. No. 3,383,435.

As noted above, the amorphous polyphenylene oxides, or those with modified crystallinity, and the styrene resins are combinable with each other in all proportions. Consequently, compositions comprising from 1 to 99 percent, by weight, of polyphenylene oxide and from 99 to 1 percent, by weight, styrene resin can be made with the products of the products of the present invention. In general, compositions containing from 10 to 85 percent polyphenylene oxide resin and from 90 to 15 percent styrene resin exhibit the best overall combination of properties.

DESCRIPTION OF THE PREFERRED EMBODIMENTS

The process of this invention and the benefits obtained by melt blending an amorphous polyphenylene oxide, or one of reduced crystallinity, with a styrene resin are illustrated in the following examples which are set forth as a further description of the invention. The examples are not to be construed as limiting the invention thereto.

EXAMPLE 1

To a tube type reaction vessel equipped with a stirrer, thermometer and an oxygen inlet tube, there are added 120 ml. of benzene, 1.29 g. of di-n-butylamine and 0.144 g. of anhydrous cuprous bromide. The mixture is stirred and 10.0 g. of 2,6-xylenol in 20 ml. of benzene is added. Oxygen is passed through the stirred reaction mixture for 120 min. at 25°C. The reaction is terminated by adding acetic acid, the acid layer is removed by centrifugation and the solution of poly(2,6-dimethyl-1,4-phenylene)oxide is divided into two parts. One part is precipitated by dropping the polymer solution into methanol. The precipitate is recovered and is determined to be amorphous by differential scanning calorimetry: Tm, —; Tg (°C, second heat), 220°C. The second part, designated, control sample, is precipitated by adding methanol to the polymer solution: Tm, 259°C.; Tg, 223°C.

EXAMPLE 2

Poly(2,6-dimethyl-1,4-phenylene)oxide, prepared according to the above procedure, 100 g., is dissolved in 600 ml. of chloroform and divided into portions. The first portion is slowly added to 3 volumes of methanol, with stirring, and a completely amorphous product according to this invention is recovered: Tm —; ΔQ —; Tg, 221°C. To the second portion is added slowly 3 volumes of methanol. A control sample, Tm, 260°C., ΔQ, 2.4 cal./g.; and Tg, 223°C., is obtained. Since the theoretical heat of fusion, $\Delta Q$, for 100% crystalline poly(2,6-dimethyl-1,4-phenylene)oxide is about 10.0 cal./g., and the $\Delta Q$ is directly related to percent crystallinity, the crystallinity of the conventional resin sample is indicated to be about 24%.

EXAMPLE 3

Poly(2,6-dimethyl-1,4-phenylene)oxide, prepared according to the above procedure, 50 g., is dissolved in 1000 ml. of toluene and divided into portions. The first portion is slowly added to three volumes of methanol, with stirring, and a completely amorphous product according to this invention is recovered: Tm, —; $\Delta Q$, —; and Tg, 222°C. To the second portion is added slowly 3 volumes of methanol. A control sample, Tm, 259°C.; $\Delta Q$, 3.3 cal. per g.; and Tg, 222°C., is obtained. Crystallinity from $\Delta Q$ is indicated to be about 33%.

EXAMPLE 4

A completely amorphous poly(2,6-dimethyl-1,4-phenylene)oxide is prepared by precipitation from a solution of 8 wt. % of 30 to 40% crystalline resin in toluene by adding the toluene to three volumes of methanol. The precipitate is washed and dried. The DSC indicates no crystallinity.

A powdered control sample is prepared by precipitating poly(2,6-dimethyl-1,4-phenylene)oxide from toluene by adding methanol. The control sample has a heat of fusion, $\Delta Q$, of 3.7 cal./g., indicating 37% crystallinity.

20/80 blends, by weight, are made of the amorphous material and of the control material with granular, rubber modified high impact polystyrene resin (from Cosden Petroleum Co., 825 TV PS) and molded according to the following procedure:

After tumbling each mixture in a blender for 30 seconds, they are then passed through a hopper into the cylinder of a ¾ in. Wayne single screw extruder. Extrusion is carried out at a die temperature of 480°F.; a front temperature of 590°F.; and a rear temperature of 580°F. Following extrusion the strands are pelletized and the compositions are injection molded back-to-back at a temperature of 400°F., all under the same conditions to form a series of test bars in a 3 oz. Newbury machine. Physical properties are determined on the molded test bars. The Izod impact strength is determined by the standards set forth in ASTM-D-256. Tensile and elongations are determined on an Instron tester according to ASTM-D-638. The physical properties are summarized in Table I:

Table I

| Polyphenylene Oxide Used | Crystallinity,% | Tensile Yield (psi) | Tensile Strength (psi) | Elongation,% | Izod Impact ft.lbs./in. |
|---|---|---|---|---|---|
| Properties of Compositions of Poly(2,6-dimethyl-1,4-phenylene)oxide and High Impact Polystyrene | | | | | |
| Precipitated by adding antisolvent to solution | 37 | 6900 | 6150 | 9.9 | 1.02 |
| Precipitated by adding solution to antisolvent | 0 | 7700 | 7200 | 16.0 | 1.13 |

Differential scanning calorimetry data were obtained on the molded bars. With the amorphous polymer, the compositions exhibited only one $T_g$, at 113°C., in molded bars. In contrast, the crystalline polymer provided compositions which exhibited two $T_g$'s, at 105° and 210°C., and one $T_{g(2)}$, at 107°C., in molded bars. Those skilled in the art will recognize that the amorphous resin alloyed easier than the crystalline, because fewer transition temperatures were observed, and also that it gave improved properties when processed under the same condition.

Obviously, other modifications and variations of the present invention are possible in light of the above teachings.

For example, instead of poly(2,6-dimethyl-1,4-phenylene)oxide the following may be used: poly(2,6-diethyl-1,4-phenylene)oxide; poly(2-methyl-6-ethyl-1,4-phenylene)oxide; poly(2-methyl-6-propyl-1,4-phenylene)oxide; poly(2,6-dipropyl-1,4-phenylene)oxide; and poly(2-ethyl-6-propyl-1,4-phenylene)oxide; as well as block copolymers of dimethylphenol and diphenylphenol, in which the dimethyl block segment can readily be made amorphous.

Instead of rubber-modified high impact polystyrene, improved compositions can be made with the polyphenylene oxides and crystal homopolystyrene; poly(alpha-methylstyrene); styrene-acrylonitrile copolymer; styrene-acrylonitrile-butadiene copolymer; styrene-alpha-methylstyrene copolymer; and styrene-methacrylate copolymer.

Because of their excellent physical, mechanical, chemical and thermal properties the polyphenylene oxide resins prepared according to this invention, alone or in compositions with styrene resins, or other polymers, such as polyolefins, have many and varied uses. For example, they can be used in molding powder formulations, and may contain various fillers, such as wood flour, diatomaceous earth, carbon black, silica, and the like, and reinforcing agents, such as glass filaments and glass fibers, to make molded parts.

It is to be understood that changes may be made in the particular embodiments of the invention described which are within the full scope of the invention as defined by the appended claims.

We claim:

1. A process for the preparation of a completely amorphous polyphenylene oxide having a degree of polymerization of at least 100 from a polyphenylene oxide with 30 to 40% crystallinity which comprises providing a solution of said polyphenylene oxide with 30 to 40% crystallinity in toluene and adding said solution to methanol until the precipitation of said amorphous polyphenylene oxide is substantially complete and recovering said amorphous polyphenylene oxide.

2. A process as defined in claim 1 wherein said polyphenylene oxide is of the formula

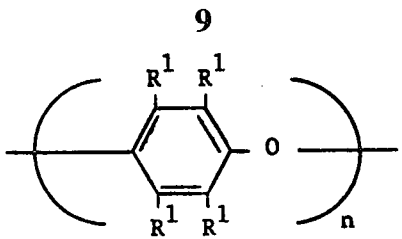

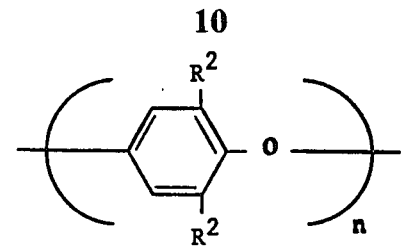

wherein the oxygen ether atom of one unit is connected to the benzene nucleus of the next repeating unit, n is a positive integer and is at least 100 and each $R^1$ is a monovalent substituent selected from hydrogen, halogen, hydrocarbon radicals free of a tertiary alpha-carbon atom, halohydrocarbon radicals having at least two carbon atoms between the halogen atom and phenyl nucleus and being free of a tertiary alpha-carbon atom, hydrocarbonoxy radicals being free of a tertiary alpha-carbon atom, and halohydrocarbonoxy radicals having at least two carbon atoms between the halogen atom and the phenyl nucleus and being free of a tertiary alpha-carbon atom.

3. A process as defined in claim 1 wherein said polyphenylene oxide is of the formula wherein each $R^2$ is alkyl of from about 1 to about 4 carbon atoms, and $n$ is a whole integer of at least 100.

4. A process as defined in claim 2 wherein said polyphenylene oxide is poly(2,6-dimethyl-1,4-phenylene oxide).

5. A process for the preparation of a completely amorphous polyphenylene oxide having a degree of polymerization of at least 100 from a polyphenylene oxide with 30 to 40% crystallinity which comprises providing a solution of said polyphenylene oxide with 30 to 40% crystallinity in chloroform and adding said solution to methanol until the precipitation of said amorphous polyphenylene oxide is substantially complete and recovering said amorphous polyphenylene oxide.

* * * * *